United States Patent

Chisholm et al.

[11] Patent Number: 6,091,491
[45] Date of Patent: Jul. 18, 2000

[54] OPTICAL FINGERPRINTING OF PLASTICS COMPOSITIONS

[75] Inventors: Greig Chisholm; William Ewen Smith; Peter Cyril White, all of Glasgow, United Kingdom

[73] Assignees: Ciba Specialty Chemicals Corporation, Tarrytown, N.Y.; University of Strathcylde, Glasgow, United Kingdom

[21] Appl. No.: 09/119,566

[22] Filed: Jul. 20, 1998

[30] Foreign Application Priority Data

Jul. 24, 1997 [GB] United Kingdom ............... 9715550

[51] Int. Cl.⁷ .................................................. G01J 3/44
[52] U.S. Cl. .................... 356/301; 356/300; 356/402; 356/337
[58] Field of Search .................... 356/300, 402, 356/337, 301

[56] References Cited

U.S. PATENT DOCUMENTS

| | | | |
|---|---|---|---|
| 4,231,918 | 11/1980 | Bäbler | 260/40 |
| 4,233,206 | 11/1980 | Katsura et al. | 260/42.21 |
| 4,826,898 | 5/1989 | Hirosawa et al. | 524/88 |
| 5,665,429 | 9/1997 | Elwakil | 427/218 |
| 5,718,754 | 2/1998 | Macpherson et al. | 106/413 |
| 5,866,241 | 2/1999 | Xiang | 428/210 |

FOREIGN PATENT DOCUMENTS

| | | |
|---|---|---|
| 0 191 240 | 8/1986 | European Pat. Off. . |
| 0702055 | 3/1996 | European Pat. Off. . |
| 0786498 | 7/1997 | European Pat. Off. . |
| 2 256 923 | 12/1992 | United Kingdom . |
| 2 264 558 | 9/1993 | United Kingdom . |
| 84/01781 | 5/1984 | WIPO . |
| 91/11492 | 8/1991 | WIPO . |
| 93/09172 | 5/1993 | WIPO . |

*Primary Examiner*—Frank G. Font
*Assistant Examiner*—Reginald A. Ratliff
*Attorney, Agent, or Firm*—Kevin T. Mansfield; David R. Crichton

[57] ABSTRACT

A plastics material which contains a pigment composition comprising a pigment having adsorbed on its surface, or as a physical mixture, up to 10% by weight, based on the total weight of pigment composition of a coding compound which is a compound containing azo, azomethine or polycyclic chromophore and which has an absorption spectrum and a Raman spectrum different from that of the pigment.

9 Claims, No Drawings

OPTICAL FINGERPRINTING OF PLASTICS COMPOSITIONS

The present invention relates to coloured plastics compositions and to a method for identifying them.

BACKGROUND OF THE INVENTION

With the increasing price of plastics feedstocks, the limited availability of landfill sites for the disposal of plastics, and pressure from environmental groups, it has now become necessary to recycle plastics wherever possible. The present invention provides a method for doing so which is dependant upon the detection of the pigmentation in a plastic.

SUMMARY OF THE INVENTION

A plastics material, e.g. a transparent or opaque plastic bottle is pigmented to give it colour. If, when pigmenting the bottle, a small quantity of a Raman active pigment is added it will have minimal impact on the colouration of the item, but when this bottle is disposed of, recycling is enhanced if a laser of wavelength known to be in resonance with the coding pigment is used to generate Raman spectra of the plastics waste. Comparison of the generated spectrum with that of the original bottle will facilitate identification of the bottle and thus sorting and recycling of coded components in the waste.

By incorporating more than one Raman active pigment and incorporating a laser detection system with lasers operating at different wavelengths it is possible to detect a number of different coding pigments simultaneously thus enabling either a greater number of plastics materials to be identified simultaneously, or allowing more than one coding pigment to be incorporated in the plastics material. If a different coding compound or mixture is used in different plastics, this enables multiple items to be sorted.

Increasingly plastics are being used in high-value items such as computers, car and electronic components. As such they have become the target for theft and fraud. Another application of the invention is to incorporate a coding pigment into high-value plastic items, also into credit cards, to enable both authentication, and also proving the source or identity of a particular material.

A further application of this invention is in determining the age of e.g. pipework, where significant ageing or decomposition may represent a health or safety hazard. A pipe could be coloured in the conventional manner with a coding pigment added which is arbitrarally chosen to represent a particular time corresponding to when the pipe was laid. Use of resonance raman spectroscopy will then allow identification of the age of the pipe, by identifying the pigment used to code it. This technqiue has advantages over simply date-stamping the pipe in that the coding pigment is extremely durable, and is unlikely to suffer significant decomposition, and also the coding is applied to the whole pipe, allowing examination at any point along its length.

A significant advantage of all the methods discussed above is that using resonance Raman spectroscopy (RRS) ensures not only a strong signal for the pigment being detected, but also minimal interference from the bulk plastic, and other pigmentary material present.

DETAILED DESCRIPTION OF THE INVENTION

Accordingly the present invention provides a plastics material which contains a pigment composition comprising a pigment having adsorbed on its surface, or as a physical mixture, up to 10% by weight, based on the total weight of pigment composition of a compound containing an azo, azomethine or polycyclic chromophore and which has an absorption spectrum and a Raman spectrum different from that of the pigment. The composition may be prepared either from a pigment powder or from a masterbatch.

The compound which is adsorbed on the pigment surface or is added as a physical mixture is referred to herein as the coding compound.

Any of a wide range of pigments may be used such as monoazo yellow, disazo yellow, monoazo red, disazo orange, benzimidazolone, azo condensation, anthraquinone, quinacridone, isoindoline, dioxazine, metal complex, perylene, diketopyrrolopyrrole, phthalocyanine pigments, inorganic pigments, or mixtures thereof.

The pigment may be optionally treated with a range of conventional pigment additives such as resins, dyestuffs and/or surfactants.

The coding compound which is physically mixed with the pigment should be thermally stable at the temperature used to process the bulk pigment and plastics. Examples of suitable coding compounds include the pigments mentioned above, an isoindolinone, diketopyrrolopyrrole, Schiff's base metal complex, ferricyanide, an unsubstituted metal phthalocyanine or a compound of formula (1).

Formula (1)

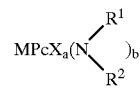

wherein

Pc is a phthalocyanine nucleus

M is a metal atom, a chloro-metal group, an oxy-metal group or hydrogen

X is halogen $R^1$ is an organic radical $R^2$ is H or an optionally substituted alkyl radical a has an average value from 15 to 1 b has an average value from 1 to 15 a+b is from 4 to 16.

The coding compound should preferably have an absorption frequency maximum at or near an absorption minimum of the pigment or even be outside the spectral range of the pigment. This separation gives the maximum sensitivity for detection by RRS.

If the wavelength of the illuminating light is matched with the absorption maximum of the coding compound then the Raman spectrum recovered is significantly enhanced allowing much greater sensitivities to be obtained. This in turn means that much lower amounts of coding compound are required for identification or alternatively that lower radiation levels can be used for the incident light. Furthermore, the colour of the coding compound can be more effectively masked so that it is effectively invisible.

The matching of the wavelengths of the illuminating radiation and the absorption maximum of the coding compound can be achieved in two ways. Firstly the laser wavelength may be selected to any devised wavelength and can therefore be used to detect the Raman spectrum of the coding compound in the presence of many different substances. Alternatively the coding compound can be selected so that it possesses an absorption maximum at or close to the available laser frequency. This latter option allows the lowest cost system without loss of efficiency since tunable lasers are expensive.

The laser frequency can be visible, ultraviolet or infra-red when matched with suitably absorbing coding compounds.

Thus for example, by selecting a coding compound with an absorption maximum at or near 518 nanometers and incorporating this material in a plastics material a Raman spectrometer using laser illumination of 518 nanometers can easily detect the presence or absence of the coding compound.

For example the pigment may have an absorption maximum at 673 nm and the coding compound an absorption maximum at 518 nm.

By using laser illumination at a frequency of 518 nm, the coding compound can be readily detected. If two laser frequences are used e.g. 673 and 518 nm the ratio of the pigment and coding compound can be determined. This enables authentication to be more certain.

The amount of the coding compound should be not greater than 5% by weight in order to avoid changing the colour of the pigment. Lower amounts can be used provided that they are within the limits of detection by RRS.

The use of RRS provides a significant advantage over fluorescence spectroscopy in that the use of pigments and pigmentary materials as the coding compound is permitted. The resolution obtained from coding compounds by RRS is very much superior to fluorescence resolution. This allows the use of more than one coding compound to be incorporated while still providing a usable fingerprint spectrum for detection.

A suitable combination of pigment and coding compound to give absorption maxima at 673 nm and 518 nm is a calcium 4B metal salt pigment (Pigment Red 57.1) having copper phthalocyanine as the coding compound.

In order to adsorb the desired coding compound on the pigment it is only necessary to stir the compounds together in water or other suitable solvents or dry mixing or use of dispersion equipment if the coding compound is to be physically mixed with the pigment.

Mixtures of coding compounds may be used, e.g. for use in dating pipes. The first year a single compound may be used. The second year a mixture of two compounds in a ratio of 10:90 may be used, then 20:80 in the third year etc. up to 100% of the second compound in the 11th year. Detection of the ratio will then give the year of manufacture.

In many cases, coloured plastics articles are printed on with inks. In this case it is preferred that the coding compound is not one which is normally used in printing inks, so that it can still be detected, or that the laser is directed at a non-printed portion of the plastics.

Examples of suitable plastics are the following:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).
b) catalytic polymerisation using a catalyst that normally contains one or more than one metal of groups IV b, V b, VI B or VIII of the Periodic Table. These metals usually have one or more than one ligand, typically oxides, halides, alcoholates, esters, ethers, amines, alkyls, alkenyls and/or aryls that may be either π- or σ-co-ordinated. These metal complexes may be in the free form or fixed on substrates, typically on activated magnesium chloride, titanium (III) chloride, alumina or silicon oxide. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (Du Pont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/-isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylene-norbornene; and mixtures of such copolymers with one other and with polymers mentioned in 1) above, for example polypropylene/ethylene-propylene copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymers or an ethylene/-propylene(diene terpolymer; and block copolymers of styrene such as styrene/butadiene/-styrene, styrene/isoprene/styrene, styrene/ethylene/butylene/styrene or styrene/ethylene/-propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α, β-unsaturated acids and derivatives thereof such as polyacrylates and polymethyacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, poly-amide 6, polyamide 6/6, 6/10, 6/9, 6/12, 4/6, 12/12, polyamide 11, polyamide 12, aromatic polyamides starting from a m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehydes resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellolose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/

ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PEP/PC.

The invention is illustrated by the following Examples.

EXAMPLE 1

0.05 g of copper phthalocyanine is blended with 0.15 g of pigment red 57:1 until an intimate powder mix is obtained. The powder is then mixed with titanium dioxide (2 g) and polyvinyl chloride mixture (40 g) containing Corvic S71-102, a PVC powder manufactured by EVC (25.2 g), Irgastab CZ130 (0.6 g), a stabiliser manufactured by Ciba Specialty Chemicals, dioctylphthalate (12.8 g), Reoplast 39 (1.2 g), an auxiliary stabiliser maufactured by Ciba Specialty Chemicals, and Irgastab CH301 (0.2 g), an auxiliary stabiliser manufactured by Ciba Specialty Chemicals. The mixture is then milled on a 2 roll mill for 8 minutes to produce a pigmented plastic hide.

Detection

Detection of the minor component in the plastic is by use of a Renishaw 2000 spectrometer. Excitation is provided with a helium-neon laser at 632 nm.

The minor component of the pigment mixture (copper phthalocyanine) is easily distinguishable in the recovered detection spectrum from the surface of the plastic with peaks at 674 cm$^{-1}$, 740 cm$^{-1}$, 1444 cm$^{-1}$, and 1523 cm$^{-1}$. The peaks for the major component (pigment red 57:1) are at 1357 cm$^{-1}$, 1486 cm$^{-1}$, and 1597 cm$^{-1}$.

EXAMPLE 2

0.02 g of copper phthalocyanine are blended with 0.18 g of pigment red 57:1 until an intimate powder mix is obtained. The plastic hide is prepared in the same manner as Example 1.

The minor component (copper phthalocyanine) in Example 2 is detected in the same manner as Example 1, and is clearly distinguishable by means of the same peaks.

EXAMPLE 3

0.01 g of copper phthalocyanine are blended with 0.19 g of pigment red 57:1 until an intimate powder mix is obtained. The plastic hide is prepared in the same manner as Example 1.

The minor component (copper phthalocyanine) in Example 3 is detected in the same manner as Example 1, and is clearly distinguishable by means of the same peaks.

What is claimed is:

1. A plastics material which contains a pigment composition comprising a pigment having adsorbed on its surface, or as a physical mixture, up to 10% by weight, based on the total weight of pigment composition of a coding compound which is a compound containing azo, azomethine or polycyclic chromophore and which has an absorption spectrum and a Raman spectrum different from that of the pigment.

2. The material of claim 1 in which the pigment is a monoazo yellow, disazo yellow, monoazo red, disazo orange, benzimidazolone, azo condensation, anthraquinone, quinacridone, isoindoline, dioxazine, metal complex, perylene, diketopyrrolopyrrole, phthalocyanine pigment, an inorganic pigment or mixtures thereof.

3. The material of claim 1 in which the coding compound is a monoazo yellow, disazo yellow, monoazo red, disazo orange, benzimidazolone, azo condensation, anthraquinone, quinacridone, isoindoline, dioxazine, metal complex, perylene, diketopyrrolopyrrole or phthalocyanine organic pigment, an inorganic pigment or a mixture thereof, an isoindolinone, diketopyrrolopyrrole, Schiff's base metal complex, ferricyanide, an unsubstituted metal phthalocyanine or a compound of formula (1),

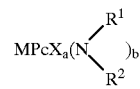

Formula (1)

wherein

Pc is a phthalocyanine nucleus,

M is a metal atom, a chloro-metal group, an oxy-metal group or hydrogen,

X is halogen,

R$^1$ is an organic radical,

R$^2$ is H or an optionally substituted alkyl radical, a has an average value from 15 to 1, b has an average value from 1 to 15, and a+b is from 4 to 16, or a mixture thereof.

4. The material of claim 1 in which the coding compound has an absorption frequency maximum at or near an absorption minimum of the pigment or is outside the spectral range of the pigment.

5. The material of claim 1 in which the amount of the coding compound is not greater than 5% by weight.

6. The material of claim 1 in which the pigment is a calcium 4B metal salt pigment (Pigment Red 57.1) having copper phthalocyanine as the coding compound adsorbed on its surface.

7. A method for identifying a plastics material, which comprises incorporating in said material a pigment composition comprising a pigment having adsorbed on its surface, or as a physical mixture, up to 10% by weight, based on the total weight of pigment composition of a coding compound which is a compound containing azo, azomethine or polycyclic chromophore and which has an absorption spectrum and a Raman spectrum different from that of the pigment, illuminating said item with a laser and detecting a resulting Raman absorption with a Raman spectrometer.

8. A method according to claim 7 for the detection of the presence of a plastics material in a plastic based item, which comprises illuminating said item with a laser and detecting a resulting Raman absorption with a Raman spectrometer.

9. A method according to claim 7 wherein the plastics material is a credit card, a transparent or opaque bottle or a length of pipe.

* * * * *